UNITED STATES PATENT OFFICE.

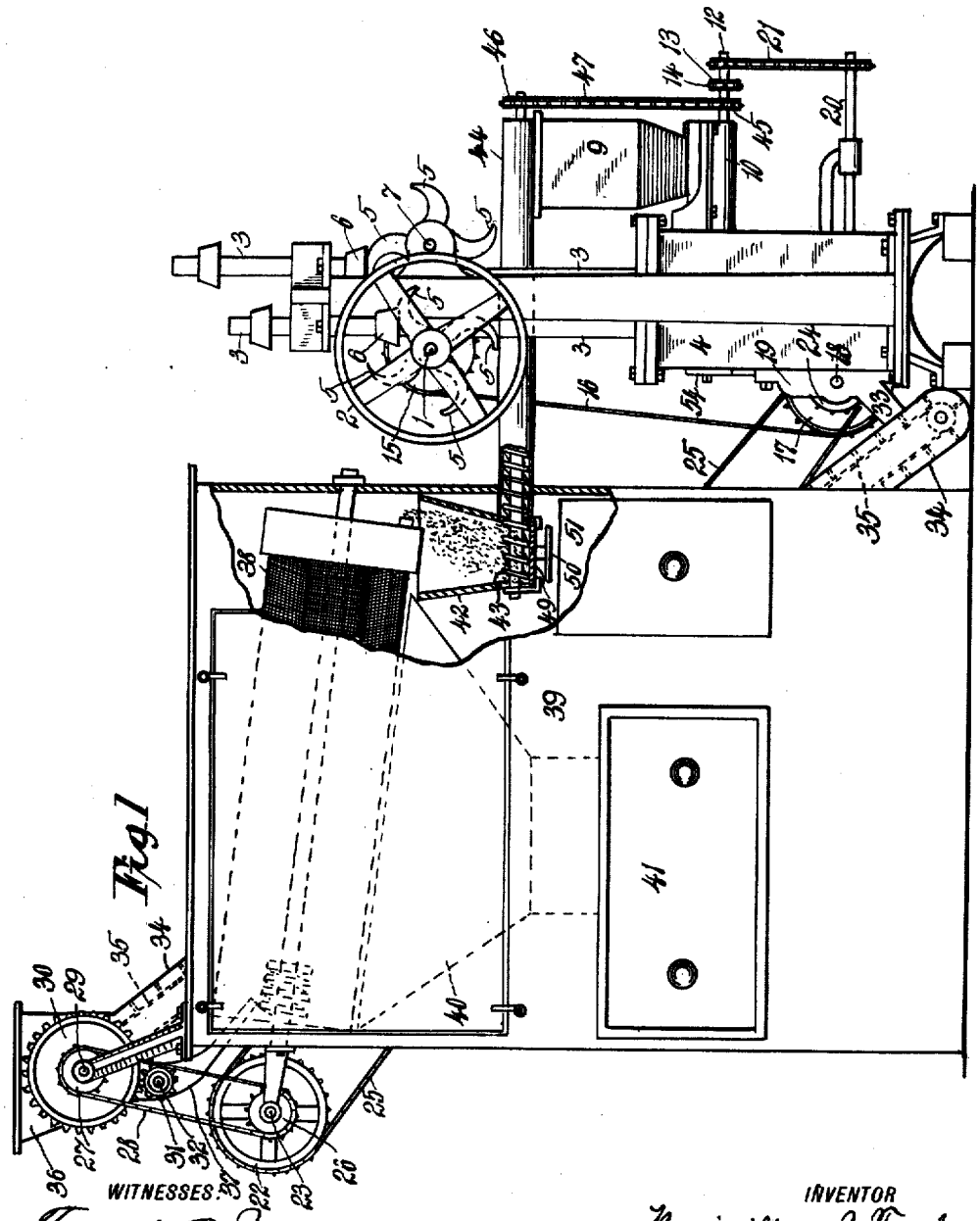

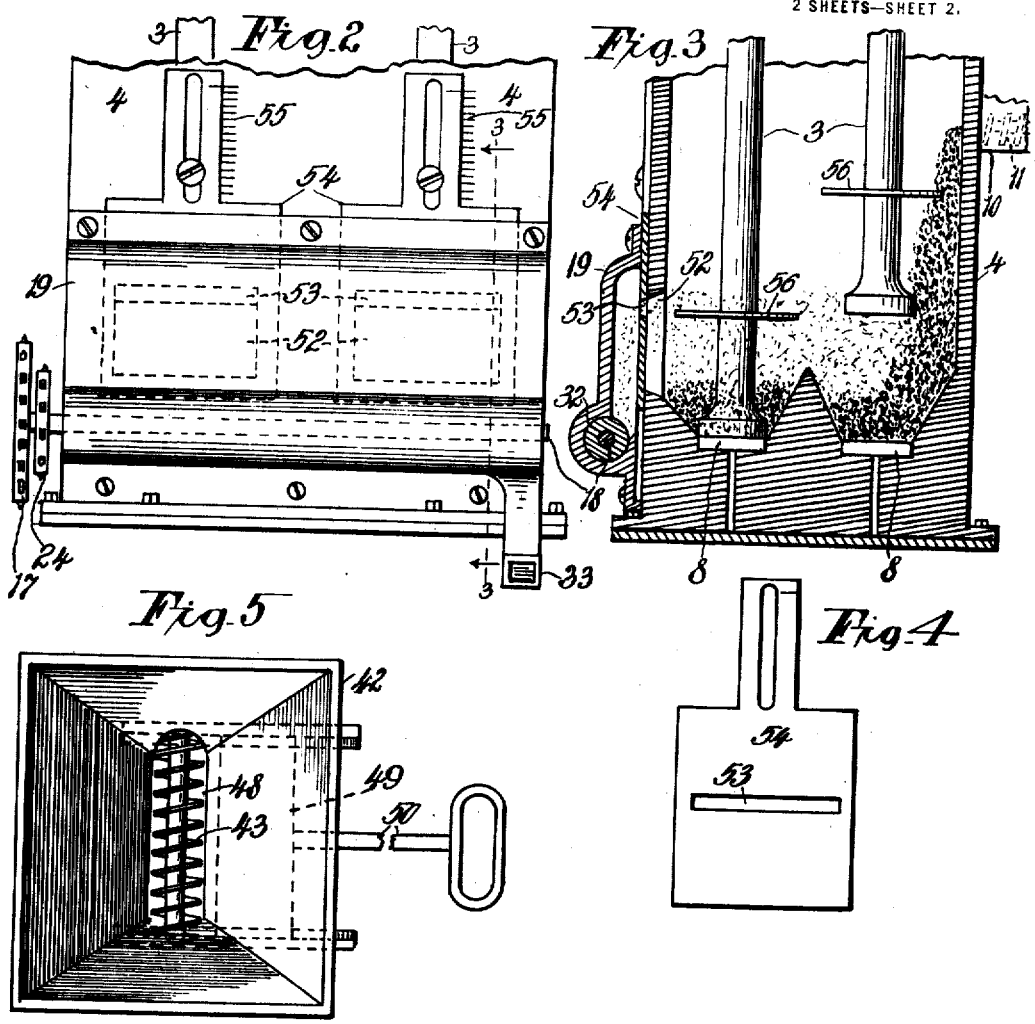

MAXIMILIAN J. FUCHS, OF STAMFORD, CONNECTICUT.

MACHINE FOR MAKING BRONZE-POWDER.

1,310,526. Specification of Letters Patent. Patented July 22, 1919.

Application filed March 16, 1917. Serial No. 155,194.

*To all whom it may concern:*

Be it known that I, MAXIMILIAN J. FUCHS, citizen of the United States, residing at Stamford, in the county of Fairfield and State of Connecticut, have invented certain new and useful Improvements in Machines for Making Bronze-Powder; and I do hereby declare the following to be a full, clear, and exact description of the invention, such as will enable others skilled in the art to which it appertains to make and use the same.

My invention relates to machines for making bronze powder, and is an improvement on my former Patents 647,081 and 681,447, wherein only a limited number of grades of powder could be discharged from the mortars during the beating process. In my present improvement I have provided means whereby an indefinite number of grades of the powder can be selected at will. It is often necessary to temporarily arrest the operation of the beaters to fill a hurried order for powder of a certain quality which could only be done formerly by first manually removing the material already in the mortars, which process was not only slow but it also entailed quite a loss of the finer product when exposed to the outer air currents.

Referring to the drawings:

Figure 1 represents a broken side elevation partly in section of a bronze powder beating machine;

Fig. 2 is an enlarged broken elevation of the mortars;

Fig. 3 is an enlarged sectional view of the mortars on line 3—3 of Fig. 2;

Fig. 4 is an enlarged detail view of one of the graduating slides; and

Fig. 5 is an enlarged upper detail plan view of the hopper for receiving the powder to be rebeaten and means for conveying it to the mortars and means for intercepting the flow of unfinished material to the mortars.

A brief description of the general construction and operation of the machine for making bronze powder will be necessary in order to show the aforesaid improvements and the advantages derived thereby.

1 is the driving shaft, 2 the driving pulley, 3 beaters operating in the mortars 4, which beaters are elevated by the rotatable lifters 5—engaging the beater collars 6— mounted on the shafts 1 and 7 and drop by gravity on the anvils 8. 9 is the hopper in which the metal to be treated is first placed and is conveyed therefrom to the mortars by worms located in the extension 10, one of said worms, 11, being shown in Fig. 3. 12 is one of the worm shafts and the other worm shaft—not shown—is driven from the sprocket wheel 13 and chain 14. The rotation of these shafts is effected by means of the sprocket wheel 15, chain 16 and sprocket wheel 17 on the worm shaft 18 mounted in the removable plate 19. 20 is a shaft rotatably connected to the worm shaft 18, in an ordinary manner—not shown—and 21 is a sprocket chain transmitting power to the worm shaft 12.

22 is a sprocket wheel mounted on the shaft 23, and said wheel is rotated through the medium of the sprocket wheel 24—on the worm shaft 18—and the chain 25. Sprocket wheels 26—27 and chain 28 transmit motion to the shaft 29 carrying the gear 30 meshing with the pinion 31 on the worm shaft 32. The beaten material passes out of the mortars into the recessed front plate 19 and is carried by the worm 32 into the spout 33 and is delivered into the casing 34 from whence it is carried by the endless bucket chain 35 into the hopper 36, and from thence it is delivered through the spout 37 into the inclined rotatable sieve 38 located in the cabinet 39. The finer particles are received by the hopper 40 and discharged into the drawer 41, the coarser particles being returned to the mortars to be rebeaten.

In my former constructions, these coarser particles were carried by gravity from the end of the sieve to the hopper 9, and no provision was made to intercept this continuous circulating flow of metal until all of the metal in the mortars was exhausted by this beating and rebeating process. Nor, as before mentioned, was any provision made for temporarily and automatically removing the unfinished metal from the mortars to give place for metal of another quality except the laborious and wasteful method of emptying the mortars by hand.

In my present construction, the sieve 38 discharges the coarser particles into the hopper 42 at the bottom of which is located the worm 43, incased in the tube 44, and is returned thereby to the hopper 9. This worm is rotated from the worm shaft 12 by means of the sprocket wheels 45—46 and chain 47. At the bottom of the hopper 42, Figs. 1 and 5, is an opening 48 adapted to be closed by the gate 49 whose handle 50 projects outside of the cabinet 39. When necessary to remove a certain quantity of the metal and at any stage of the beating process, the gate 49 is temporarily withdrawn, Fig. 5, and the extracted metal is deposited in the drawer 51, and the gate is then closed to permit the interrupted flow to be returned to the hopper 9. To automatically empty the mortars for the reception of metal of a different quality, the gate is kept withdrawn until the remaining contents in the mortars have been discharged into the drawer 51.

In my former constructions, as before mentioned, only a very limited and a predetermined number of grades of the beaten metal could be delivered from the mortars through separate outlets or ports, in the sides of the mortars. In my present construction, these separate outlets have been converted into the large outlet 52, Figs. 2 and 3, and the narrow outlet 53—see also Fig. 4—is provided in the vertically operated slides 54, located between the outer face of the mortars and the inner face of the plate 19.

Graduation marks 55 are provided on the face of the mortars, each mark representing a certain grade so that the slides can be readily adjusted with respect to their narrow outlets and the large outlets in the mortars and thus deliver a grade of powder of any degree and color required. This feature, in connection with the before mentioned gate 49, will enable the operator to readily extract, at any period of the beating process, any particular grade desired.

The slides 54, Figs. 2 and 3, are shown raised to the highest point to bring their outlets at the upper end of the large outlet 52 of the mortars. This position of the outlets 53 permits the finer particles of metal to escape when the fixed flanges 56 on the beater rods pass down through the floating particles of metal. The outlets in the face of the mortars are deep enough to allow the escape of any commercial grade of powder. In other words, the upper edge of the outlets 52 represent the highest practical point at which the lighter and finer grades of commercial powder can be delivered from the mortars, and the lower edge of said outlets represents the lowest practical point of delivery of the coarser grades.

Having thus described my invention what I claim is:—

In a bronze powder machine, a motor having a relatively large opening of an area to embrace the entire floating range of all metals in a side thereof, a slide covering said opening so as to form a part of the mortar side, said slide having an opening of less width than that of the mortar opening but of substantially the same length as the length of the mortar opening, and means to allow of vertical adjustments of the slide so as to vary the relation of the slide opening with respect to the top and bottom of the mortar opening while maintaining a constant alined relation of the ends of the slide opening with respect to the ends of the mortar opening.

In testimony whereof I affix my signature.

MAXIMILIAN J. FUCHS.

It is hereby certified that in Letters Patent No. 1,310,526, granted July 22, 1919, upon the application of Maximilian J. Fuchs, of Stamford, Connecticut, for an improvement in "Machines for Making Bronze Powder," an error appears in the printed specification requiring correction as follows: Page 2, line 58, claim, for the word "motor" read *mortar;* and that the said Letters Patent should be read with this correction therein that the same may conform to the record of the case in the Patent Office.

Signed and sealed this 9th day of December, A. D., 1919.

[SEAL.]

M. H. COULSTON,

*Acting Commissioner of Patents.*

Cl. 83—57.